(12) United States Patent
Kato et al.

(10) Patent No.: US 9,864,147 B2
(45) Date of Patent: Jan. 9, 2018

(54) OPTICAL MODULATOR MODULE

(71) Applicant: Fujitsu Optical Components Limited, Kawasaki-shi, Kanagawa (JP)

(72) Inventors: Hiroshi Kato, Kawasaki (JP); Shinji Maruyama, Sapporo (JP); Kohei Shibata, Isehara (JP); Seimi Sasaki, Sagamihara (JP); Teruhiro Kubo, Kitahiroshima (JP); Takehito Tanaka, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/085,283

(22) Filed: Mar. 30, 2016

(65) Prior Publication Data

US 2016/0349457 A1 Dec. 1, 2016

(30) Foreign Application Priority Data

May 26, 2015 (JP) ................................. 2015-106703

(51) Int. Cl.
| | |
|---|---|
| *G02B 6/32* | (2006.01) |
| *G02B 6/122* | (2006.01) |
| *G02B 6/30* | (2006.01) |
| *G02B 6/27* | (2006.01) |
| *G02F 1/025* | (2006.01) |

(52) U.S. Cl.
CPC ............ *G02B 6/32* (2013.01); *G02B 6/1228* (2013.01); *G02B 6/2706* (2013.01); *G02B 6/30* (2013.01); *G02F 1/025* (2013.01)

(58) Field of Classification Search
CPC ...... G02B 6/12; G02B 6/1223; G02B 6/1228; G02B 6/2706; G02B 6/30; G02B 6/32; G02B 6/4201; G02B 6/4249; G02F 1/025

USPC ............ 385/1–10, 14, 33–35, 49–52, 88–92, 385/129–132
See application file for complete search history.

(56) References Cited

U.S. PATENT DOCUMENTS

| | | | |
|---|---|---|---|
| 5,517,359 A * | 5/1996 | Gelbart ................... | B41J 2/451 359/619 |
| 6,711,203 B1 * | 3/2004 | Garnache ............ | H01S 5/02288 372/45.01 |
| 2003/0095311 A1 * | 5/2003 | Liu ......................... | H04J 14/08 398/98 |
| 2005/0259923 A1 * | 11/2005 | Sriram .................. | G02F 1/3132 385/50 |

(Continued)

FOREIGN PATENT DOCUMENTS

| | | |
|---|---|---|
| JP | 2000-98191 | 4/2000 |
| JP | 2010-156842 | 7/2010 |
| WO | WO2009/063986 | 5/2009 |

*Primary Examiner* — Akm Enayet Ullah
*Assistant Examiner* — Michael Mooney
(74) *Attorney, Agent, or Firm* — Staas & Halsey LLP

(57) ABSTRACT

An optical modulator module includes: a semiconductor modulator that includes a plurality of output waveguides; a first cylindrical lens that has a longitudinal direction in a direction in which the plurality of output waveguides are aligned, and through which lights output from the plurality of output waveguides penetrate; and a plurality of second cylindrical lenses each having a longitudinal direction that intersects with the longitudinal direction of the first cylindrical lens and allowing a corresponding light of the lights output from the plurality of output waveguides to penetrate therethrough.

12 Claims, 10 Drawing Sheets

(56) References Cited

U.S. PATENT DOCUMENTS

| | | |
|---|---|---|
| 2010/0296776 A1 | 11/2010 | Ishii et al. |
| 2011/0234985 A1* | 9/2011 | Ryf .................. G03B 21/14 353/38 |
| 2011/0255147 A1 | 10/2011 | Oguri |
| 2015/0078761 A1* | 3/2015 | Yamaji ............. H04B 10/501 398/182 |

* cited by examiner

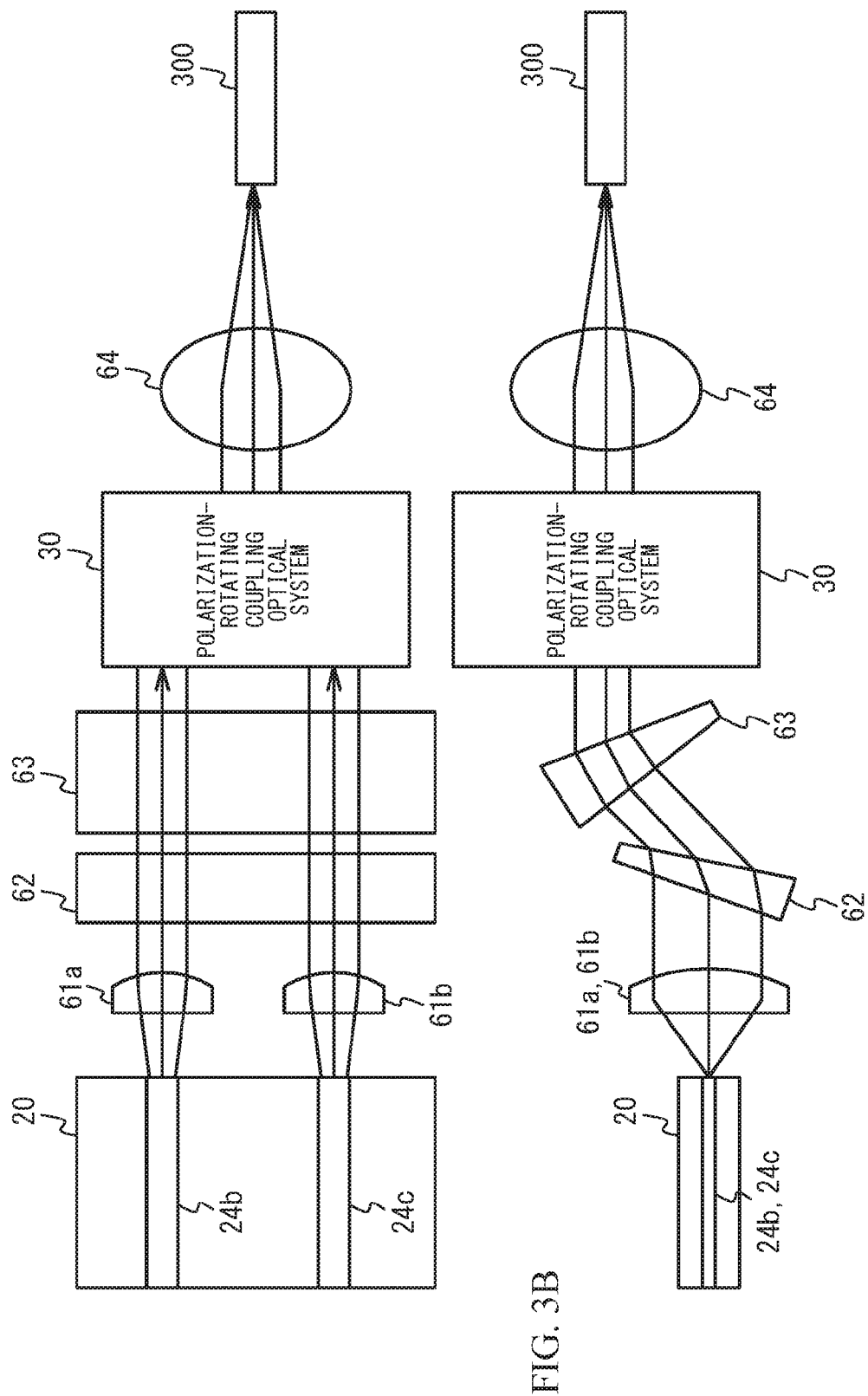

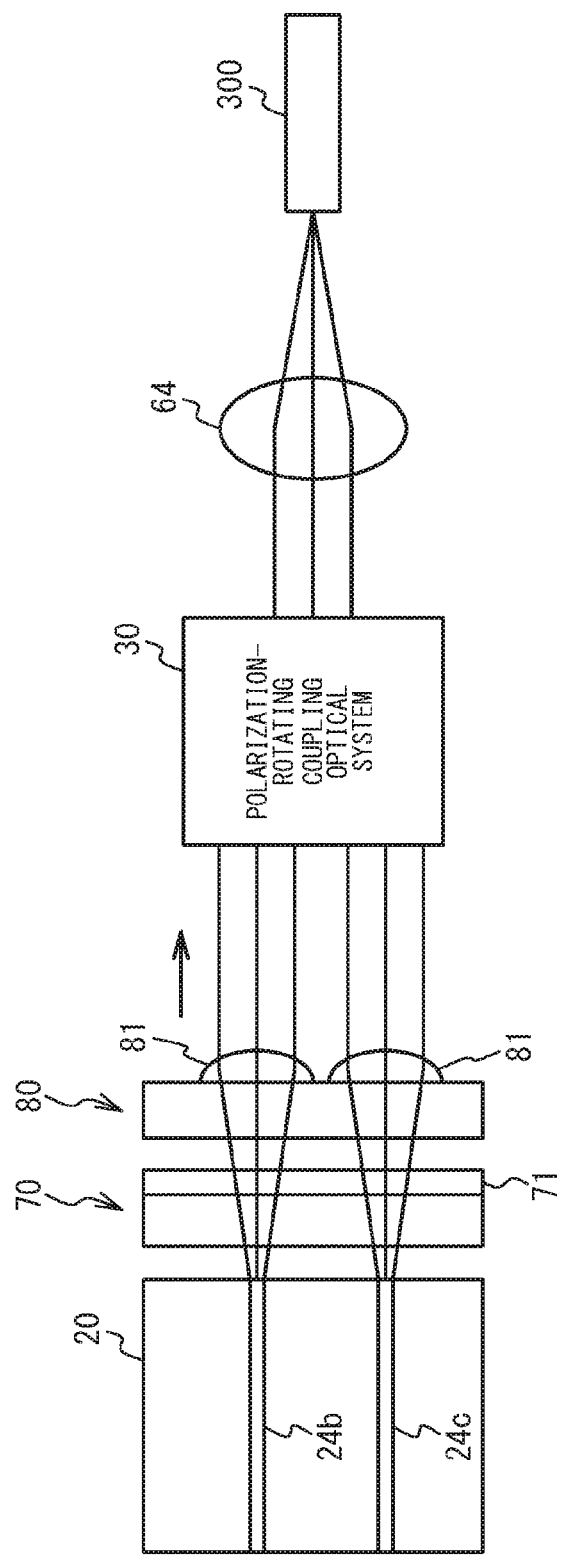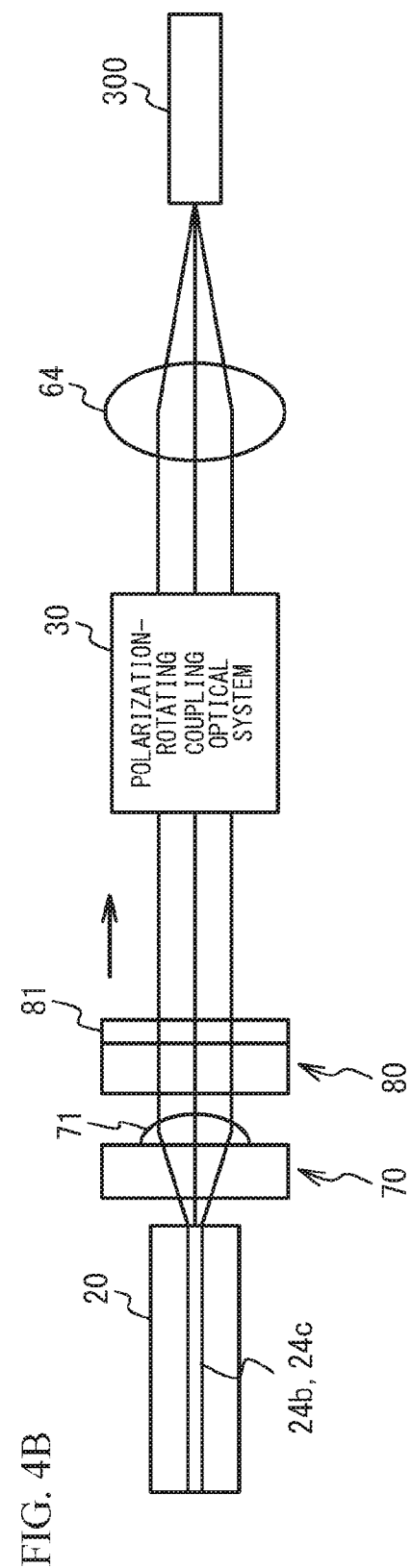
FIG. 4A
FIG. 4B

OPTICAL MODULATOR MODULE

CROSS-REFERENCE TO RELATED APPLICATION

This application is based upon and claims the benefit of priority of the prior Japanese Patent Application No. 2015-106703, filed on May 26, 2015, the entire contents of which are incorporated herein by reference.

FIELD

A certain aspect of embodiments described herein relates to an optical modulator module.

BACKGROUND

LiNbO$_3$ external modulators (hereinafter, referred to as an LN modulator) are widely used in the high-speed optical communication system (see Japanese Patent Application Publication No. 2010-156842, for example). However, the material property of the LN modulator makes the reduction in size of the LN modulator difficult. Thus, semiconductor modulators have been developed as a small external modulator.

SUMMARY

According to an aspect of the present invention, there is provided an optical modulator module including: a semiconductor modulator that includes a plurality of output waveguides; a first cylindrical lens that has a longitudinal direction in a direction in which the plurality of output waveguides are aligned, and through which lights output from the plurality of output waveguides penetrate; and a plurality of second cylindrical lenses each having a longitudinal direction that intersects with the longitudinal direction of the first cylindrical lens and allowing a corresponding light of the lights output from the plurality of output waveguides to penetrate therethrough.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A and FIG. 3B illustrate a beam shaping system between the semiconductor modulator and an output fiber;

FIG. 4A and FIG. 4B illustrate a beam shaping system in accordance with the first embodiment;

DESCRIPTION OF EMBODIMENTS

As previously described, semiconductor modulators have been developed as a small external modulator. However, since a light output from the semiconductor modulator has an elliptical shape, optical coupling loss may be caused by a mode mismatch when the semiconductor modulator is optically coupled to an optical fiber.

Hereinafter, embodiments will be described with reference to accompanying drawings.

First Embodiment

Figure 1A:
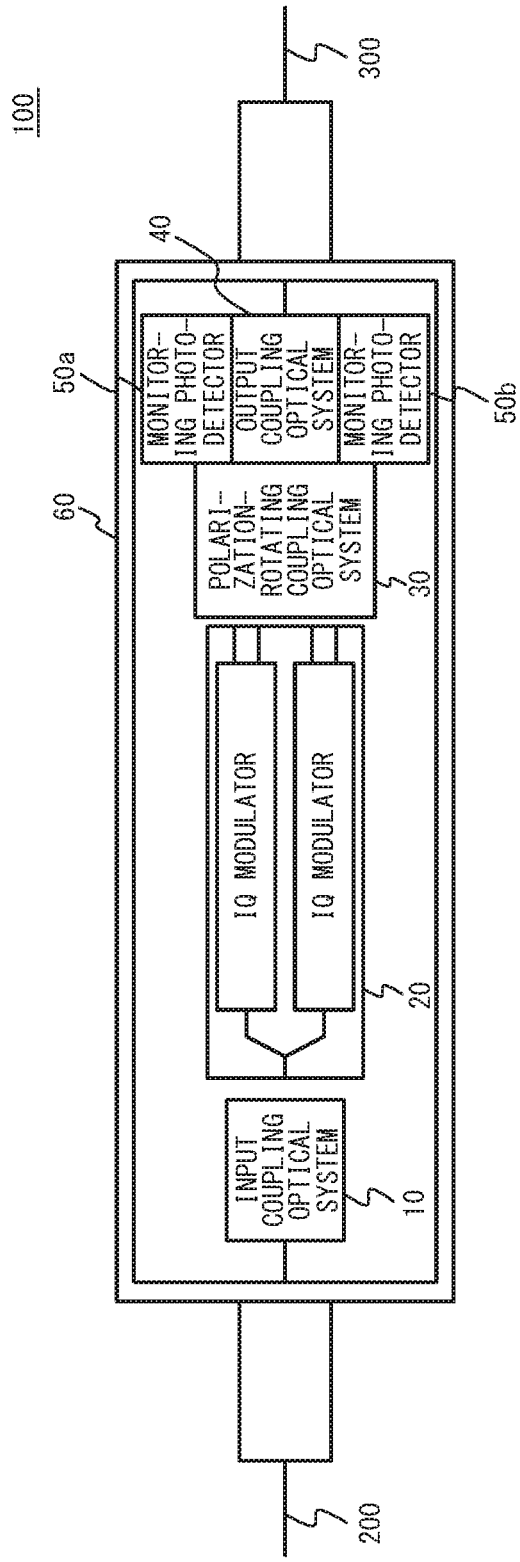
FIG. 1A is a schematic diagram of an optical modulator module in accordance with a first embodiment.

FIG. 1A is a schematic diagram of an optical modulator module 100 in accordance with a first embodiment. As illustrated in FIG. 1A, the optical modulator module 100 has a structure designed so that an input coupling optical system 10, a semiconductor modulator 20, a polarization-rotating coupling optical system 30, an output coupling optical system 40, and monitoring photodetectors 50a and 50b are arranged in a package 60. The optical modulator module 100 is coupled to an input fiber 200 and an output fiber 300.

Figure 1B:
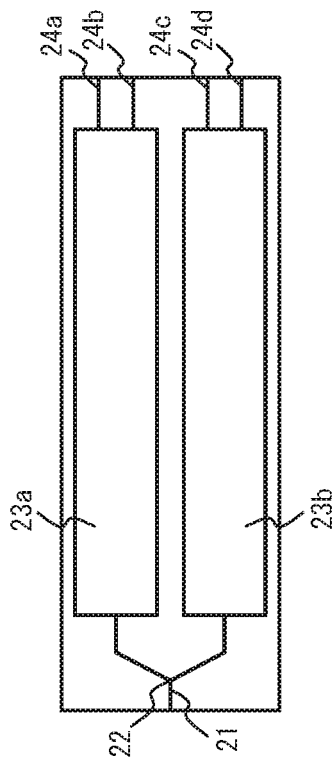
FIG. 1B is an enlarged view of a semiconductor modulator.

FIG. 1B is an enlarged view of the semiconductor modulator 20. As illustrated in FIG. 1B, the semiconductor modulator 20 includes one input waveguide 21, a 3 dB coupler 22 that splits a light entering from the input waveguide 21, IQ modulators 23a and 23b each modulating the corresponding split light, and output waveguides 24a through 24d that output signal lights and monitoring lights corresponding to the signal lights from the IQ modulators 23a and 23b. For example, the output waveguides 24b and 24c are waveguides through which a signal light propagates, and the output waveguides 24a and 24d are waveguides through which a monitor light propagates.

The input coupling optical system 10 causes a light from the input fiber 200 to enter the input waveguide 21. The polarization-rotating coupling optical system 30 polarization-rotates one of two identical linearly polarized signal lights output from the output waveguides 24b and 24c, and then polarization-multiplexes them. The output coupling optical system 40 couples the polarization-multiplexed signal light to the output fiber 300. Each of the monitoring photodetectors 50a and 50b receives the corresponding one of two monitor lights output from the output waveguides 24a and 24d.

The output waveguides 24a through 24d confine lights with a semiconductor such as InP. In this structure, the light is strongly confined. Thus, the mode field of the waveguided light is very small, approximately submicron to several micrometers. The spread angle θ of a light emitted to the air from the semiconductor waveguide is expressed by the following equation (1) where λ represents a wavelength and ω represents the radius of the 1/e$^2$ diameter of the mode field of a waveguided light. Thus, the output light from the semiconductor waveguide has a large spread angle. For example, θ is 28 degrees when ω is 1 μm and λ is 1550 nm.

$$\theta = \lambda/(\pi\omega) \quad (1)$$

On the other hand, in the LN modulator used as an external modulator, the mode field of the LN waveguide is close to the mode field of a fiber. A typical fiber has a mode field diameter of 10 μm and a spread angle of 5.7 degrees. The mode field of the LN waveguide has a shape relatively close to a circle. Thus, the LN waveguide is easily coupled to an optical fiber having a circular mode field.

Figure 2:
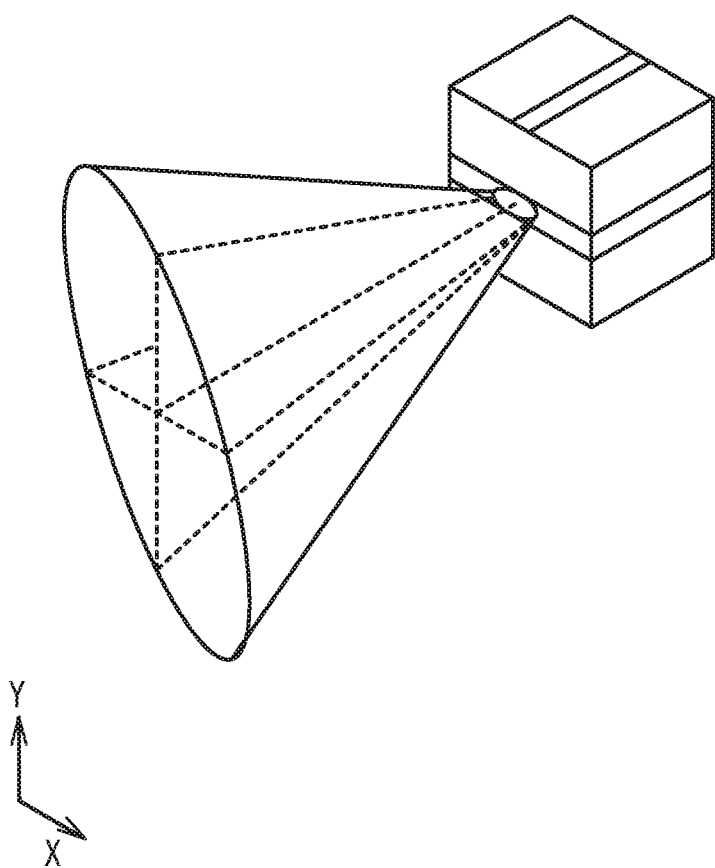
FIG. 2 illustrates an emitted light.

In contrast, the light output from the semiconductor waveguide typically has different mode fields in the width direction (the x direction) and the thickness direction (the y direction) of the waveguide. For example, the mode field diameter in the thickness direction (the y direction) is less than the mode field diameter in the width direction (the x direction) in the output waveguides 24a through 24d. In this case, as illustrated in FIG. 2, the spread angle of the emitted light in the y direction is greater than that in the x direction. In this case, the emitted light has an elliptical shape of which the major axis corresponds to the y direction. Thus, when the semiconductor waveguide is coupled to an optical fiber having a circular mode field, optical coupling loss is caused by the mode mismatch. Therefore, the emitted lights from the output waveguides 24a through 24d are preferably shaped into a circle.

For example, the mode field in the x direction may be made smaller and circular by narrowing, for example, ridging, the widths of the outputting end faces of the output waveguides 24a through 24d to enhance the confinement of the light in the x direction. However, in this case, a slight manufacturing error greatly changes the mode field. Thus, the control of the mode field is difficult. Accordingly, as illustrated in FIG. 3A and FIG. 3B, a beam shaping optical system in which a spot size conversion system combining anamorphic prisms is implemented may be considered.

FIG. 3A and FIG. 3B illustrate a beam shaping system between the semiconductor modulator 20 and the output fiber 300. FIG. 3A is a top view of the beam shaping system, and FIG. 3B is a side view of the beam shaping system. As illustrated in FIG. 3A and FIG. 3B, spherical lenses 61a and 61b, an anamorphic prism 62, and an anamorphic prism 63 are arranged between the output waveguides 24b and 24c and the polarization-rotating coupling optical system 30. Furthermore, a condenser lens 64 is arranged between the polarization-rotating coupling optical system 30 and the output fiber 300. However, this structure increases the number of components. In addition, this structure makes the adjustment of the optical axes of optical devices more complicated. Therefore, the cost increases.

A light is also shaped into a circle by kicking a part of the end of the light having an elliptical shape by a circular aperture. However, the aspect ratio of the light of the semiconductor waveguide becomes approximately two to three times. Thus, the kicking of the light reduces the power, resulting in the increase in coupling loss to the light fiber eventually. The use of a micro lens array (MLA) with an aspherical shape (e.g., an elliptical shape) enables to inhibit the light from being kicked and shape the beam. However, complex shapes are difficult to manufacture in micro lens arrays fabricated by photolithography process, such as silicon micro lens arrays.

When two or more semiconductor waveguides are arranged in an array as the semiconductor modulator 20, the manufacturing error in the positions of the centers of the lenses in the MLA causes the optical axis deviations between the semiconductor waveguide and each lens of the MLA. This optical axis deviations cause the optical axis deviation in the position of the optical fiber and greatly affect the optical coupling efficiency and PDL (polarization-dependent loss). In the optical system that couples a semiconductor waveguide to an optical fiber, when the mode field diameter $\omega 1$ of the semiconductor waveguide and the mode field diameter $\omega 2$ of the optical fiber meet the condition of magnification $m=\omega 2/\omega 1$, the optical axis deviation at the semiconductor waveguide side increases by m times. For example, in the case of $\omega 1=2$ μm and $\omega 2=5$ μm, when the optical axis deviates by 1 μm at the semiconductor waveguide side, the optical axis deviates by 2.5 μm at the optical fiber side (at this time, the coupling efficiency decreases by approximately 2.2 dB). The variation in angles can be corrected by adding an optical element. However, the addition of the optical element increases the number of components and makes the adjustment of the optical axes more complicated, leading to the increase in costs.

Thus, to form a collimated light and couple the collimated light to an optical fiber with high efficiency without increasing the number of components, the present embodiment uses two cylindrical lens arrays having shapes relatively easily manufactured from a high refractive index material and of which the longitudinal directions intersect each other.

FIG. 4A and FIG. 4B illustrate a beam shaping system in accordance with the present embodiment. FIG. 4A is a top view of the beam shaping system, and FIG. 4B is a side view of the beam shaping system. As illustrated in FIG. 4A and FIG. 4B, an MLA 70 and an MLA 80 are arranged between the output waveguides 24b and 24c and the polarization-rotating coupling optical system 30 in this order from the semiconductor modulator 20 side in the light propagation direction.

The MLA 70 includes one cylindrical lens 71 (a first cylindrical lens). The cylindrical lens 71 has a shape obtained by cutting out a part of the side surface of a cylinder. The cylindrical lens 71 is arranged on the output face of the MLA 70 so that the convex side of the cylindrical lens 71 faces the polarization-rotating coupling optical system 30. The longitudinal direction of the cylindrical lens 71 corresponds to the central axis of the cylinder. When the cylindrical lens 71 is viewed from the longitudinal direction, the cross-section is the same at any point. The cylindrical lens 71 may have a vault shape, and the curvature radius of the curved surface may not be constant.

The cylindrical lens 71 is arranged so that the longitudinal direction is parallel to the direction in which the output waveguides 24b and 24c are aligned in the MLA 70. In addition, the cylindrical lens 71 has a length that allows the output lights from the output waveguides 24b and 24c to penetrate through the cylindrical lens 71. As illustrated in FIG. 4B, the curvature of the cylindrical lens 71 is located in the thickness directions (the y direction) of the output waveguides 24b and 24c. Accordingly, the spread of the emitted light in the y direction is shaped.

On the output face of the MLA 80, located are two cylindrical lenses 81 (second cylindrical lenses) so that the convex sides face the polarization-rotating coupling optical system 30. The two cylindrical lenses 81 are arranged so that each of the lights output from the output waveguides 24b and 24c penetrates through the corresponding cylindrical lens 81. The longitudinal direction of each cylindrical lens 81 intersects with the longitudinal direction of the cylindrical lens 71. For example, the longitudinal direction of each cylindrical lens 81 intersects with the longitudinal direction of the cylindrical lens 71 at right angles. As illustrated in FIG. 4A, the curvature of the cylindrical lens 81 is located in the width directions (the x direction) of the output waveguides 24b and 24c. Accordingly, the spread of the emitted light in the x direction is shaped.

The above configuration shapes the spread in the y direction in the cylindrical lens 71, and shapes the spread in the x direction in the cylindrical lens 81. Accordingly, the excess loss and the effect of diffraction due to the kicking of the beam is minimized, and a collimated light is allowed to be formed. That is to say, the optical coupling loss is reduced.

The cylindrical lenses 71 and 81 preferably have refractive indexes greater than the refractive index of glass (1.4 to 2.1). This configuration increases the change in the refractive index experienced when a light enters the cylindrical lenses 71 and 81, making it easy to collimate a beam. For example, the cylindrical lenses 71 and 81 preferably have refractive indexes equal to 3 or greater. For example, the cylindrical lenses 71 and 81 are preferably made from silicon.

The shape of the collimated light becomes an ellipse or a circle. When the collimated light has an elliptical shape, the use of the condenser lens 64 having an anamorphic shape such as a cylindrical lens or an aspherical lens enables to correct the aspect ratio of the collimated light, thereby allowing to form a circular beam at the input end face of the optical fiber. When the collimated light has a circular shape, the use of the condenser lens 64 having a rotational symmetry with respect to the optical axis direction allows to form a circular beam at the input end face of the optical fiber.

Figure 5A:
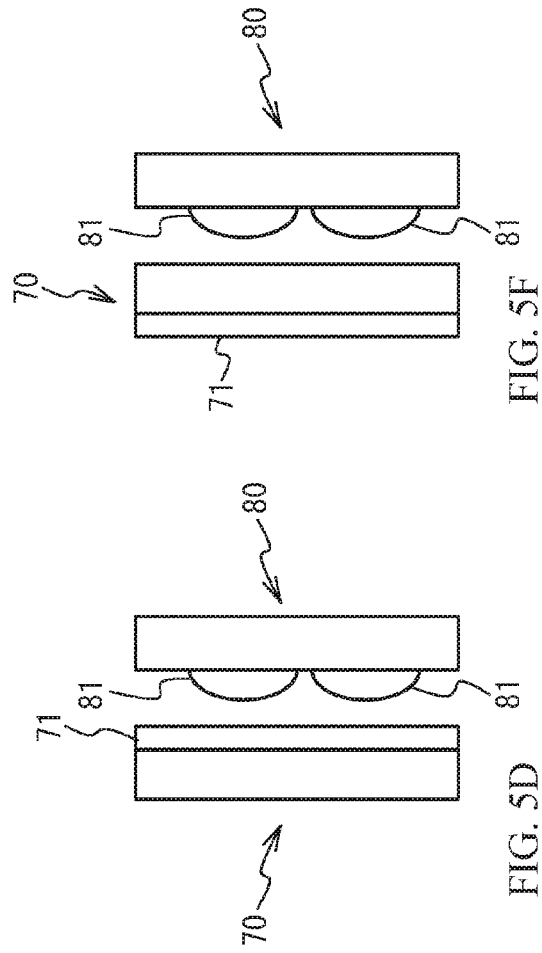
FIG. 5A through FIG. 5F illustrate examples of the arrangement of cylindrical lenses.
Figure 5C:
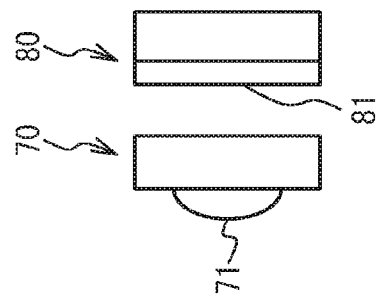
Figure 5E:
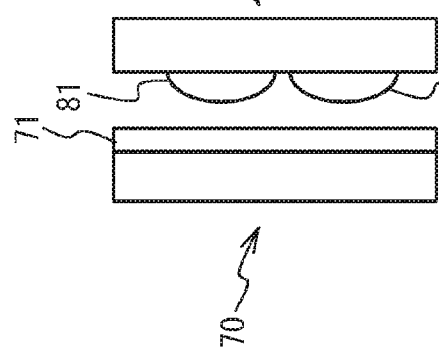
Figure 5B:
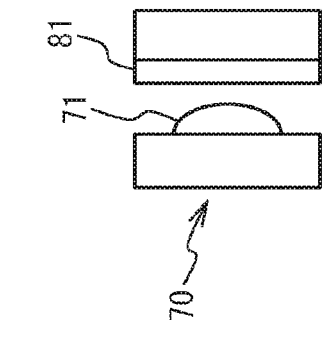
Figure 5D:
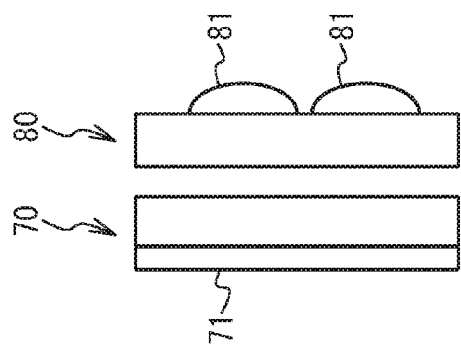
Figure 5F:
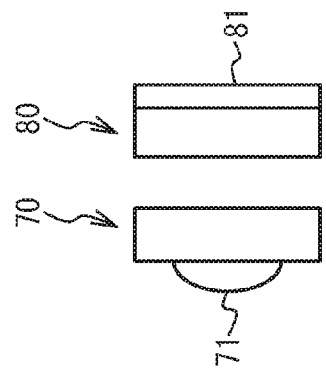

FIG. 5A through FIG. 5F illustrate examples of the arrangement of the cylindrical lens 71 and the cylindrical lenses 81. FIG. 5A, FIG. 5C, and FIG. 5E are top views. FIG. 5B, FIG. 5D, and FIG. 5F are side views. As illustrated in FIG. 5A and FIG. 5B, the cylindrical lens 71 may be arranged on the input face of the MLA 70 so that the convex side faces the output waveguides 24b and 24c. Alternatively, as illustrated in FIG. 5C and FIG. 5D, the cylindrical lenses 81 may be arranged on the input face of the MLA 80 so that the convex sides face the output waveguides 24b and 24c. Alternatively, as illustrated in FIG. 5E and FIG. 5F, the cylindrical lens 71 may be arranged on the input face of the MLA 70 so that the convex side faces the output waveguides 24b and 24c, and the cylindrical lenses 81 may be arranged on the input face of the MLA 80 so that the convex sides face the output waveguides 24b and 24c.

As described above, the convex sides of the cylindrical lenses 71 and 81 may face any of the output waveguides 24b and 24c and the polarization-rotating coupling optical system 30. The cylindrical lenses 81 may be arranged closer to the output waveguides 24b and 24c than the cylindrical lens 71 is. However, when the output lights from the output waveguides 24b and 24c have a spread angle in the y direction greater than the spread angle in the x direction, the cylindrical lens 71 is preferably arranged closer to the output waveguides 24b and 24c than the cylindrical lens 81 is. This is because this configuration can reduce the spread in the y direction.

Second Embodiment

Figure 6A:
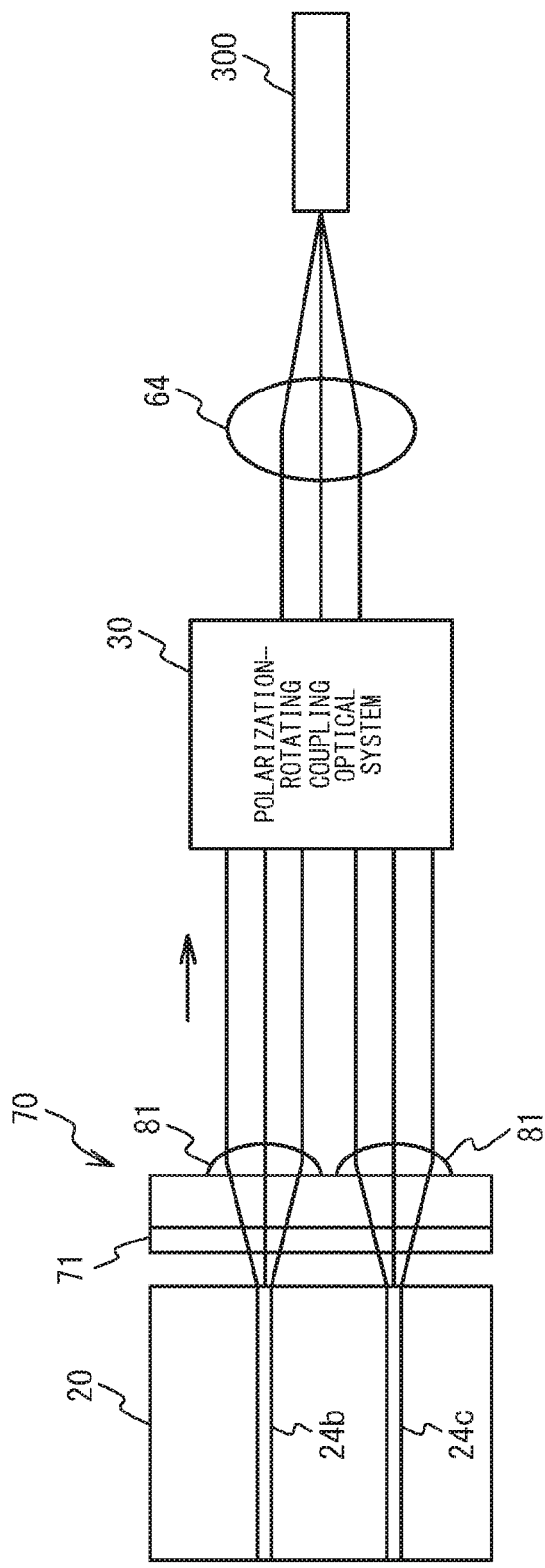
FIG. 6A and FIG. 6B illustrate a beam shaping system in accordance with a second embodiment.
Figure 6B:
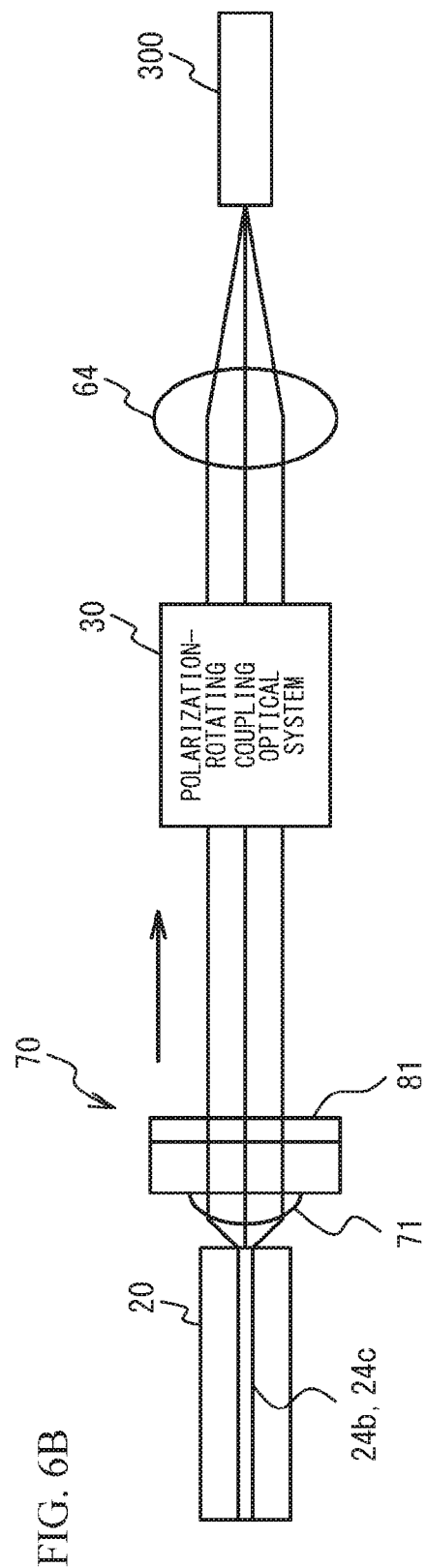

The first embodiment provides a cylindrical lens to each of the MLA 70 and the MLA 80. A cylindrical lens may be located on both faces of one MLA. FIG. 6A and FIG. 6B illustrate a beam shaping system in accordance with a second embodiment. FIG. 6A is a top view of the beam shaping system, and FIG. 6B is a side view of the beam shaping system. As illustrated in FIG. 6A and FIG. 6B, the cylindrical lens 71 may be located on the input face of the MLA 70 so that the convex side faces the output waveguides 24b and 24c, and the cylindrical lenses 81 may be located on the output face of the MLA 70 so that the convex sides face the polarization-rotating coupling optical system 30. This configuration reduces the number of components. In addition, the complexity in the optical-axis adjustment is reduced. Therefore, the cost is reduced.

Variation

Figure 7A:
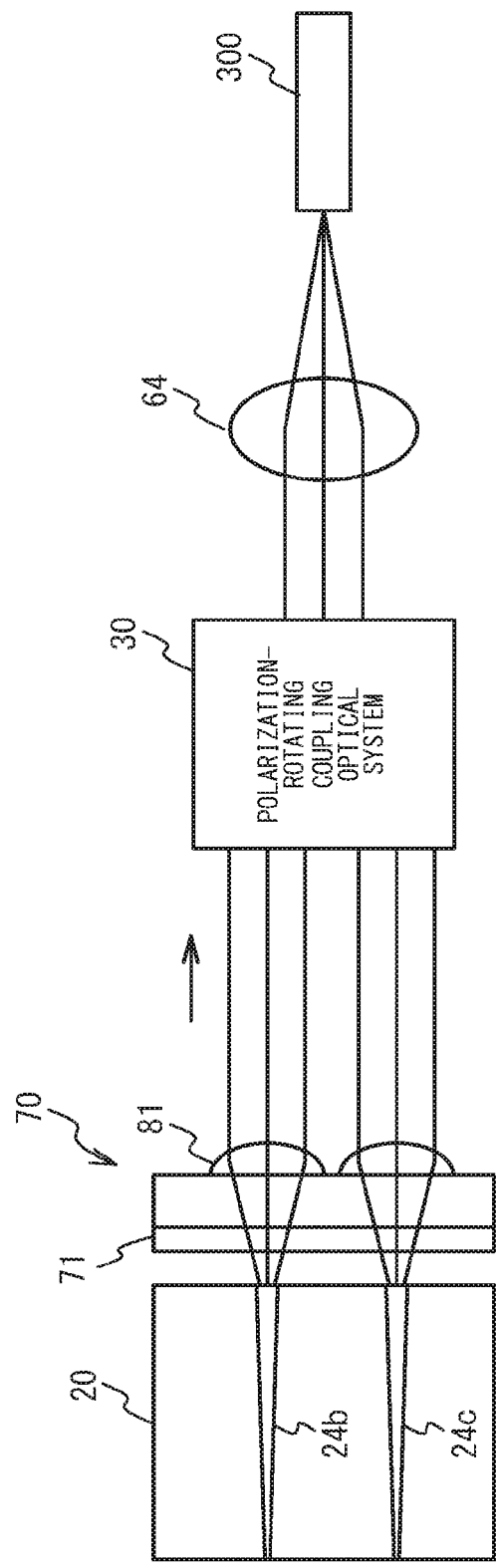
FIG. 7A and FIG. 7B illustrate an output waveguide in accordance with a variation.
Figure 7B:
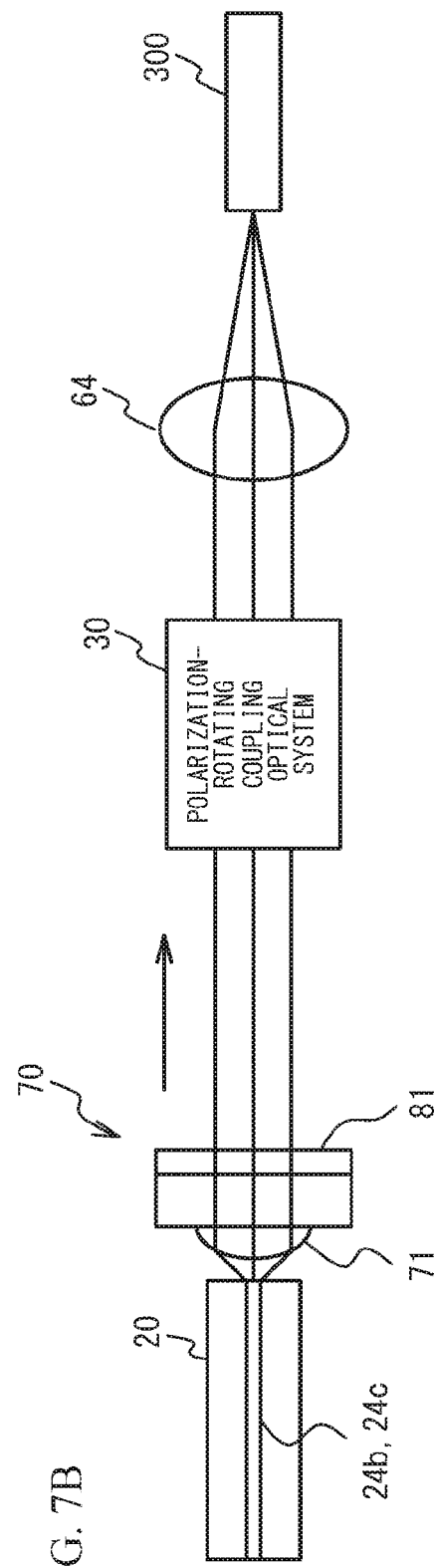

The output waveguides 24b and 24c may be tapered. This configuration allows the mode field in the x direction or in the y direction to be adjusted. Thus, the matching of the mode field with the mode field of the output fiber 300 becomes easy. FIG. 7A and FIG. 7B illustrate the output waveguides 24b and 24c in accordance with a variation. FIG. 7A is a top view of the output waveguides 24b and 24c, and FIG. 7B is a side view of the output waveguides 24b and 24c. FIG. 7A and FIG. 7B also illustrate the beam shaping system.

For example, the output waveguides 24b and 24c may be tapered so that the width increases at closer distances to the output end. As described above, the change in the width of the waveguide in the x direction allows to change the relationship between the emission distance from the MLA 70 and the size of the mode field. The same effect is obtained in the y direction by changing the thickness of the waveguide. However, in a semiconductor modulator, the thickness of the waveguide is determined based on the modulation efficiency, and it is technically difficult to change the thickness in a single substrate. Therefore, the waveguide is preferably tapered in the x direction. That is to say, the adjustment of the width of the waveguide enables to match the mode field with the mode field of the optical fiber.

In the above described embodiments and the variation, when the central axis of the cylindrical lens 71 is adjusted to be parallel to the waveguide array (the output end face of the semiconductor modulator 20), the optical axis deviation in the optical fiber due to the manufacturing error of the MLA can be reduced. Accordingly, the coupling loss and PDL are reduced. The following describes the detail of this effect.

Figure 8:
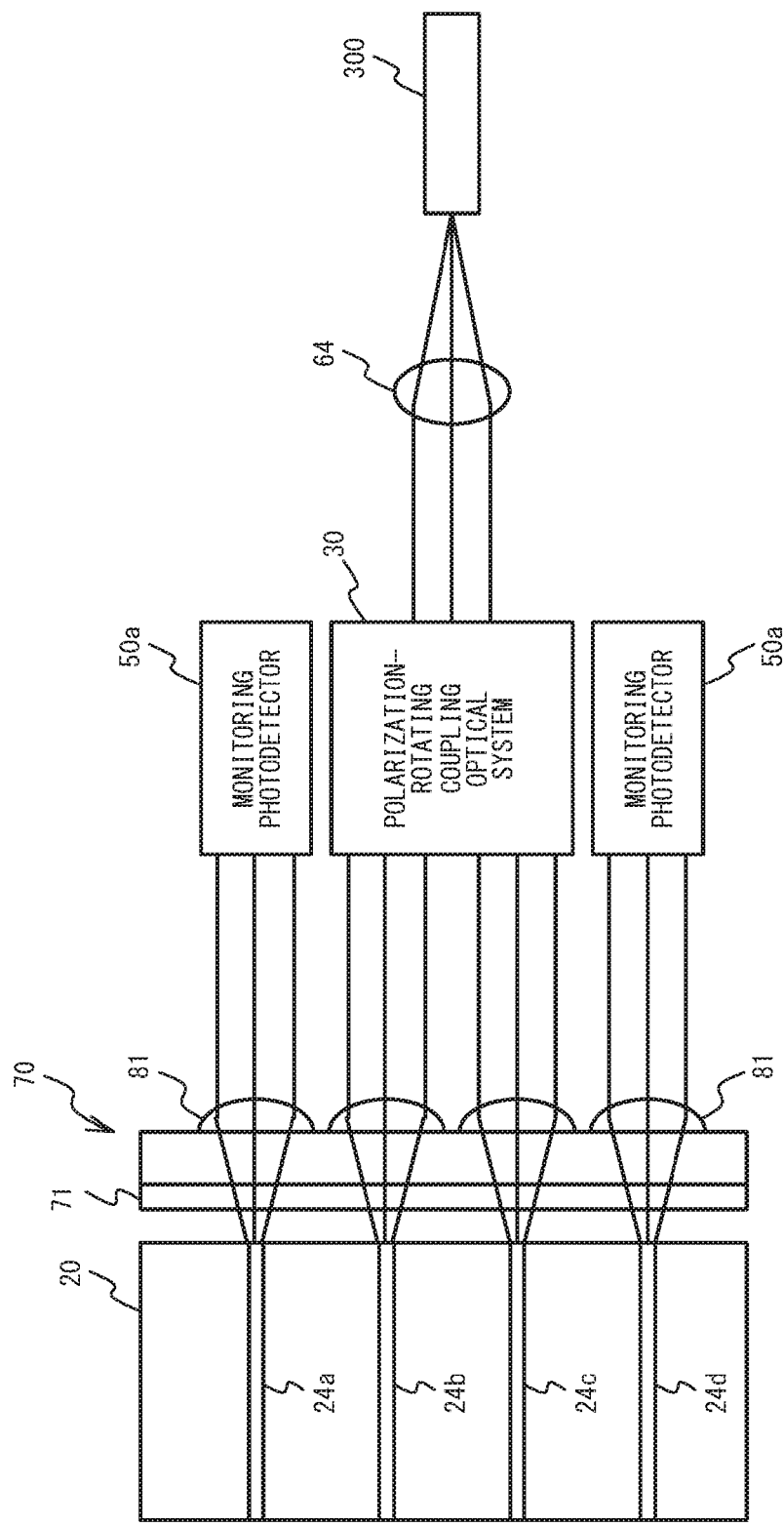
FIG. 8 is a top view of a beam shaping system.

FIG. 8 is a top view of a beam shaping system. In the example of FIG. 8, the cylindrical lens 71 is located on the input face of the MLA 70, and the cylindrical lenses 81 are located on the output face. The cylindrical lens 71 has a length that allows the lights emitted from the output waveguides 24a through 24d penetrate through the cylindrical lens 71. The cylindrical lenses 81 are located to correspond to the output waveguides 24a through 24d. Thus, four cylindrical lenses 81 are located.

Figure 9A:
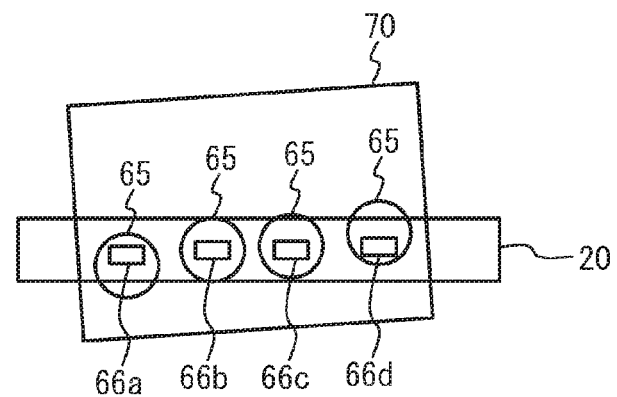
FIG. 9A and FIG. 9B are diagrams for describing a case where a spherical lens array is used.
Figure 9B:
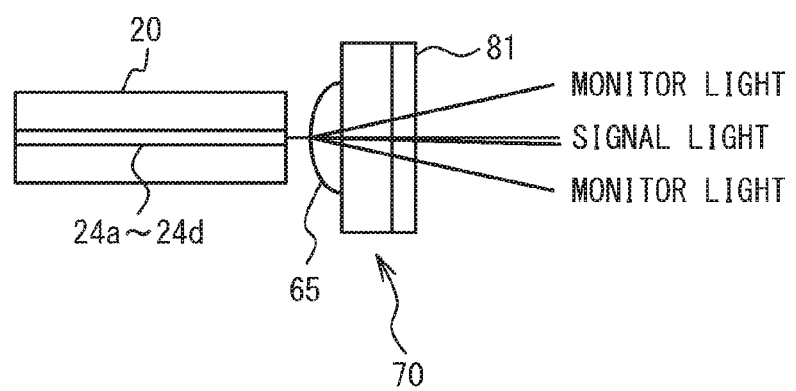

FIG. 9A and FIG. 9B are diagrams for describing a case where a spherical lens array is used instead of a cylindrical lens. FIG. 9A illustrates the semiconductor modulator 20 viewed from the polarization-rotating coupling optical system 30 side. FIG. 9B is a side view. As illustrated in FIG. 9A, when four spherical lenses 65 independent from each other are used, the positions of the four spherical lenses 65 deviate from each other due to the manufacturing error and the like. In this case, especially the deviation of the position of the outer spherical lens 65 is large. Accordingly, as illustrated in FIG. 9B, the emission angles vary between signal lights 66b and 66c and monitor lights 66a and 66d in the y direction.

Figure 10A:
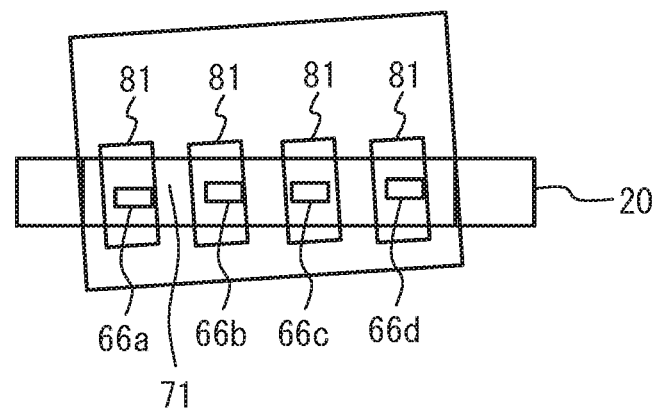
FIG. 10A and FIG. 10B are diagrams for describing a case where a cylindrical lens is used.
Figure 10B:
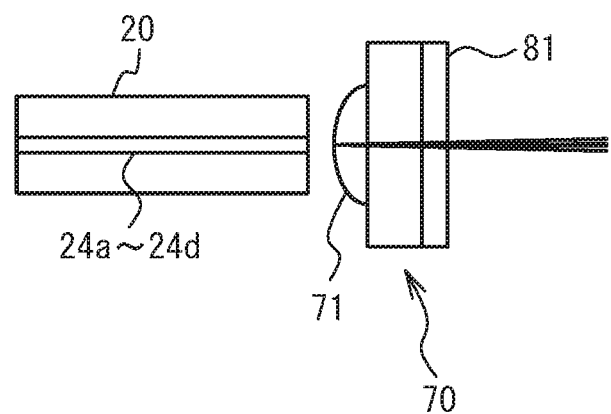

FIG. 10A and FIG. 10B are diagrams for describing a case where the cylindrical lens 71 is used. FIG. 10A illustrates the semiconductor modulator 20 viewed from the polarization-rotating coupling optical system 30 side. FIG. 10B is a side view. When the cylindrical lens 71 is used, the lens positions with respect to the output waveguides 24a through 24b are not independent of each other, and the lens positions thus hardly deviate. Thus, when the cylindrical lens 71 is used, only the adjustment of the central axis (the longitudinal direction) of the cylindrical lens 71 with respect to the semiconductor modulator 20 allows to reduce the variations in the emission angles between the signal lights 66b and 66c and the monitor lights 66a and 66d in the y direction. To make the description of the effect easy, the subjects of the output lights are four signals in FIG. 9A through FIG. 10B. However, the same effect is obtained when the subjects of the output lights are two signals as described in each embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical modulator module comprising:
   a semiconductor modulator that includes a plurality of output waveguides;
   a first cylindrical lens that has a longitudinal direction in a direction in which the plurality of output waveguides are aligned, and through which lights output from the plurality of output waveguides penetrate; and
   a plurality of second cylindrical lenses each having a longitudinal direction that intersects with the longitudinal direction of the first cylindrical lens and allowing a corresponding light of the lights output from the plurality of output waveguides to penetrate therethrough, a collimated light being output from each of the plurality of second cylindrical lenses.

2. The optical modulator module according to claim 1, wherein
   the first cylindrical lens is arranged closer to the plurality of output waveguides than the plurality of second cylindrical lenses are.

3. The optical modulator module according to claim 1, wherein
   the plurality of output waveguides have mode field diameters in a thickness direction equal to or less than mode field diameters in a width direction.

4. The optical modulator module according to claim 1, wherein
   the plurality of output waveguides have mode field diameters in an order of sub micrometers to several micrometers.

5. The optical modulator module according to claim 1, wherein
   the first cylindrical lens and the plurality of second cylindrical lenses have refractive indexes greater than a refractive index of glass.

6. The optical modulator module according to claim 1, wherein
   the first cylindrical lens and the plurality of second cylindrical lenses have refractive indexes equal to 3 or greater.

7. The optical modulator module according to claim 1, wherein
   the first cylindrical lens and the plurality of second cylindrical lenses are made from silicon.

8. The optical modulator module according to claim 1, wherein
   each of the plurality of output waveguides has a tapered shape in which at least one of a thickness and a width increases at closer distances to an output end.

9. The optical modulator module according to claim 1, wherein
   a number of the output waveguide included in the semiconductor modulator is four.

10. The optical modulator module according to claim 1, wherein
    a convex side of the first cylindrical lens or convex sides of the plurality of second cylindrical lenses face the plurality of output waveguides.

11. The optical modulator module according to claim 1, wherein
    a convex side of the first cylindrical lens and convex sides of the plurality of second cylindrical lenses face the plurality of output waveguides.

12. The optical modulator module according to claim 1, further comprising
    a single micro lens array including the first cylindrical lens on a first face and the plurality of second cylindrical lenses on a second face.

* * * * *